Dec. 3, 1929.   P. JELLINEK ET AL   1,737,659
APPARATUS FOR CALCULATING AND MEASURING PURPOSES
Filed Oct. 25, 1927
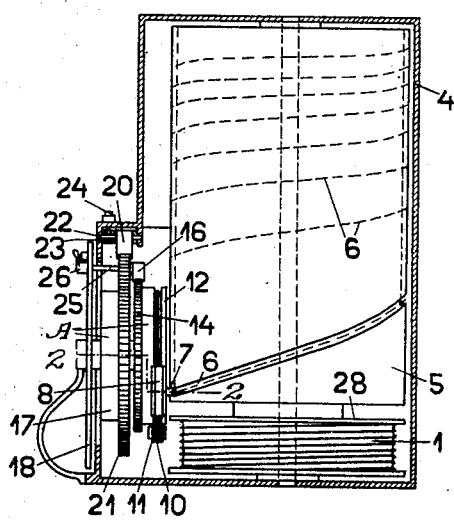
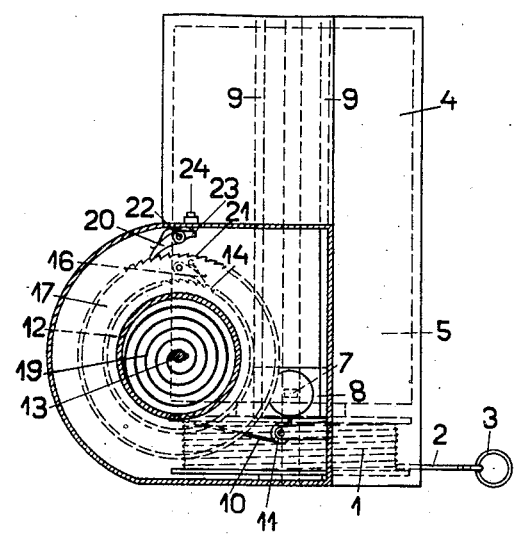
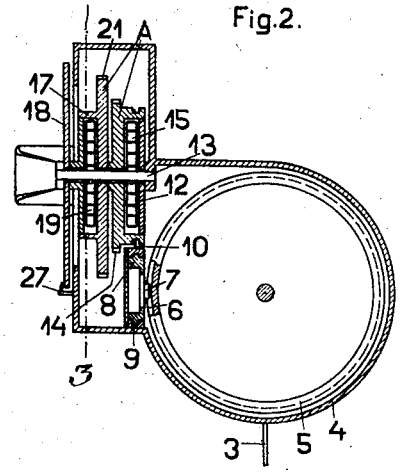
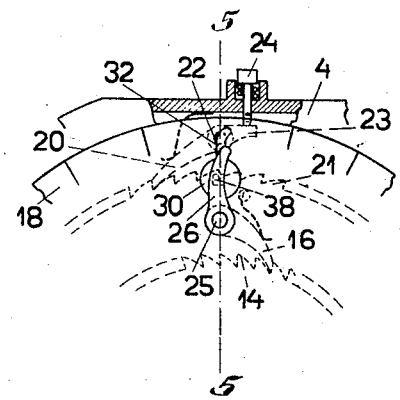
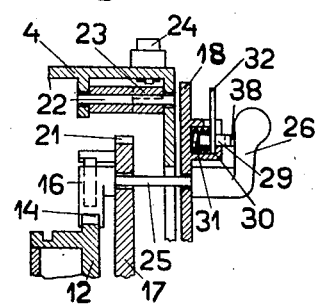

Patented Dec. 3, 1929

1,737,659

UNITED STATES PATENT OFFICE

PAUL JELLINEK AND FRITZ BEER, OF VIENNA, AUSTRIA

APPARATUS FOR CALCULATING AND MEASURING PURPOSES

Application filed October 25, 1927, Serial No. 228,669, and in Austria November 2, 1926.

This invention relates to an apparatus for calculating and measuring purposes which enables the simple solution of arithmetical and geometrical problems based on multiplication or division, especially in such cases in which the numerical determination of intermediate factors of the problem do not interest. In the apparatus according to the invention the motion of an element measuring or indicating lengths is automatically transmitted to a logarithmic result scale. In repeating this operation the product or the quotient of several quantities may be directly read from the result scale without a preceding numerical determination of the one or the other of these quantities.

Such an apparatus is especially applicable for the measuring of areas and of volumes, for example for finding the cubic contents of boxes and the like, but it is also applicable to find the length of one side from the given area or volume. In both cases intermediate arithmetical operations are unnecessary.

One of the most essential parts of the new apparatus is a guide formed as a curve according with the equation $y=k$ log. $x$ for a member, which on being actuated by the said guide follows the variations of the ordinates of the curve and transmits their variations in the one direction. Preferably the guide formed after the equation $y=k$ log. $x$ is wound upon the surface of a cylinder which is driven by the element measuring or indicating lengths. With this guide cooperates a member which may rotate around its axis and is slidable in a vertical guide.

The accompanying drawings illustrate by way of example in Fig. 1 a front view of the apparatus partly in section, the vertical guides being not shown. Fig. 2 is a section after the line 2—2 in Fig. 1 and in Fig. 3 a section after the line 3—3 in Fig. 2. Fig. 4 shows a detail of the apparatus and Fig. 5 is a section after the line 5—5 in Fig. 4.

In the illustrated embodiment of the invention a measuring cord 2 is wound round a drum 1 and may be drawn out of the casing 4 and unwound from the drum by means of the handle 3. With the drum 1 a cylinder 5 is connected, upon which a guide 6 in the form of a groove is provided, which groove represents the convolution of a curve according to the equation $y=k$ log. $x$ on the surface of the cylinder. In this equation $y$ designates the height of the curve measured parallel to the cylinder axis, $x$ is the angle through which the cylinder 5 rotates from its initial position to that ordinate which corresponds to a certain point of the curve and $k$ is a proportion factor.

If the measuring cord 2 be drawn out of the casing, the drum 1 and therewith the cylinder 5 are rotated, by which motion a spring not shown which is located in the inner part of the drum 1 becomes tensioned. A pin 7 fitting into the groove 6 is rotatably mounted in a slide block 8, the latter being adapted to slide in a vertical guide 9 fixed on the casing 4. With the slide block 8 a cord 10 is connected which cord runs over a pulley 11 and is wound on a drum 12 rotatably mounted on the axle 13. The drum 12 is provided with a toothed rim 14 and forms the one part of a coupling A. Within the coupling member 12 there is arranged a spring 15 which tends to turn back this coupling member in its initial position. With the toothed rim 14 of the coupling member 12 cooperates a latch 16 of the other coupling member 17, which is provided with a toothed rim 21. With the coupling member 17, the result scale 18, which has the form of a disc, is in the illustrated case directly connected. Within the coupling member 17 a spring 19 is located, which tends to turn back the coupling member 17 and thereby also the result scale 18 to their initial positions.

Upon the rotation of the cylinder 5, caused by the drawing out of the measuring cord 2, the pin 7 slides in the groove 6 whereby the slide block 8 is displaced upwardly in the vertical guide 9. Upon this displacement of the slide block 8 the coupling member 12 is rotated by means of the cord 10 in an anticlockwise direction (Fig. 3) and by means of the teeth of the rim 14 the latch 16 and thereby also the coupling member 17 and the disc 18 are rotated. By this the disc 18 is rotated an amount which is in a linear proportionality to the logarithm of the length measured by the measuring cord 2.

If the measuring cord is released the spring located in the drum 1 will bring back the drum 1 and the cylinder 5 to the initial position whereby also the slide block 8 returns to its initial position near the lower end of the cylinder 5. Thus the cord 10 becomes slack and under the tension of the spring 15 the coupling member 12 is also turned back to its initial position, the latch 16 running idly over the teeth of the rim 14. The coupling member 17 and the disc 18 carrying the result scale are prevented from taking part in the turning back of the other parts of the apparatus, because they are blocked by the latch 20 which engages with the toothed rim 21 of the coupling member 17. The latch 20 is rotatably mounted on an axle 22 fixed in the casing. Thus the result scale remains in the position to which it has been brought by the drawing out of the measuring cord, which position may be indicated for example by means of an index 27 fixed on the casing.

If now a second length is measured by means of the measuring cord 2, the cylinder 5 and in the manner stated above also the coupling member 12 will be rotated once more. By means of the latch 16 the coupling member 12 rotates the second coupling member 17 and therewith the result disc 18. Thus the result disc revolves again for an amount, which corresponds with the logarithm of the new measured length. Upon the two operations the disc is rotated therefore for the sum of the two logarithms and so the logarithms of the product of the two measured lengths (or this product itself) may be directly read from the result scale. If the problem consists for example in the measuring of an area the problem is already solved. If the cubic contents for example of a box is to be found, also the third side of this box is measured by means of the measuring cord 2 and then the logarithm of the product of all the three lengths measured by the measuring cord 2 may be read from the result scale.

If it is desired to bring back the result scale to its initial position the two latches 16 and 20 must be released from their respective toothed rims 14 and 21, upon which the spring 19 turns back the disc 18 together with the coupling member 17 in the initial position.

In order to ensure an easy releasing of the two latches with a single manipulation, the latch 20 is provided with an arm 23, which may be pressed down by means of a button 24. The axle 25 of the latch 16 traverses the disc 18 and carries a handle 26. By pressing down simultaneously the button 24 and the handle 26 by means of two fingers of one hand the two latches become released.

Since the latch 16 partakes in the turning back of the disc 18 and of the coupling member 17 this latch must be maintained in the released position. For this purpose the handle 26 is provided as shown in Figs. 4 and 5 with a wedge-shaped extension 38, which cooperates with a piston 29 having also a wedge-shaped end. This piston is slidably mounted in a cylinder 30 attached to the disc 18 and is brought under the action of a spring 31. With the piston 29 an arm 32 is rigidly connected which arm projects through a slot of the cylinder. If for releasing the latch 16 the handle 26 is actuated, the wedge-shaped extension 38 of this handle travels over the wedge-shaped end of the piston 29 and forces this piston against the action of the spring 31 into the cylinder. As soon as the wedge-shaped extension of the handle leaves the piston the latter under the action of the spring is forced out of the cylinder and prevents the going back of the handle and thereby of the latch 16 to the working position. When under the action of the spring 19 the turning back of the disc 18 and of the coupling member 17 is performed the button 24 is set free and simultaneously the piston 29 pressed downwardly by means of the arm 32, so that it gives way for the wedge-shaped extension of the handle 26. Under the action of the springs pressing upon the latches 16 and 20 these latches are brought back into their working positions.

The cylinder 5 must not partake immediately in the rotation of the drum when this rotation is started by drawing out the measuring cord 2. The cylinder must remain stationary until the measuring cord has been drawn out for a length which corresponds with the unit of measure of the apparatus, the logarithm of which is zero. For this reason as diagramatically shown in Fig. 1 a coupling 28 is inserted between the drum 1 and the cylinder 5 which coupling engages the cylinder 5 when the drum 1 has made the above mentioned movement. For the restoration of the cylinder 5 to its initial position a spring (not shown) is provided.

It may also be desirable to adapt the apparatus for the measuring of the cubic contents of a box in such a manner that all the three dimensions coming into consideration, that means length, breadth and height, may be measured from one and the same position of the apparatus. Since it is not possible to set up the apparatus in such a manner that the point from which the measuring cord begins to leave the drum 1 coincides exactly with the corner of the box, it is necessary to take into account also the distance existing between this starting point of the measuring cord and the corner of the box. In consequence thereof the measuring cord must be drawn up from the drum also for the said distance, before the cylinder 5 may begin its movement and the coupling 28 must be so constructed that it takes around the cylinder 5 only after a revolution of the drum 1 for an amount which corresponds with the sum of the unit of length and the distance existing between the said starting point of the measuring cord and the corner of the box.

The correction in the above sense may be made also in such a way, that the measuring cord is provided with several marks, preferably in the form of handles, which take into account the constant distances which for a certain position of the apparatus on the rectangular body exist between the point at which the cord leaves the drum and the point at which the positive measurement of length, breadth and height begins.

In order to increase the accuracy of the measurement it will be advantageous to effect the holding of the result scale during the return movement of the cylinder 5 and the drum 1 by means of this cylinder 5 or this drum 1 instead by means of the slide block 8. In the reverse lock shown there exists a certain idle running before the toothed rim 21 and therewith the result scale 18 is positively blocked, this idle running being dependent from the pitch of the teeth. Now the curves in the upper part of the cylinder 5 are very flat and therefore in this part of the cylinder a small difference in the height corresponds to a considerable difference in the logarithm. Thus the idle running of the latch 20 over the toothed rim 21 may cause rather appreciable inaccuracies in the measuring. Therefore it will be suitable to block the result scale and the coupling member 17 connected therewith just at the moment when the cylinder 5 begins its return movement.

What we claim is:

1. Apparatus for calculating and measuring purposes, comprising in combination a displaceable measuring device for measuring lengths, an indicating device, logarithmic transmission means operatively connected to said measuring device for producing movement of the indicating device proportional to the logarithm of the measurement and coupling means operatively connected to said indicating device and transmission means for establishing driving connection between the former and the latter, said coupling means being adapted to allow the measuring device to return to its inoperative position, after a measurement has been effected without producing corresponding movement of the indicating device, for the purpose of enabling the product of several quantities to be read off directly from the indicating device without previous numerical determination of the quantities.

2. Apparatus for calculating and measuring purposes as set forth in claim 1, and having means operatively connected to the measuring device for returning the latter atuomatically to its initial position after each measuring operation and means connected to the indicating device for preventing said indicating device from returning to its initial position during the return movement of the measuring device.

3. Apparatus for calculating and measuring purposes, comprising in combination a displaceable measuring device for measuring lengths, a displaceable member having a logarithmic curved guide formed according to the equation $y = k \log. x$ connected to said measuring device, an indicating device, a displaceable actuating member in engagement with said guide, guiding means for constraining said actuating member to move only in the direction of the ordinates of the curve of the logarithmic curved guide and coupling means connected to said indicating device and actuating member for establishing driving connection between the former and the latter, said coupling means being capable of transmitting the movement of the actuating member to the indicating device in one direction only.

4. Apparatus for calculating and measuring purposes, comprising in combination a displaceable measuring device for measuring lengths, a rotatable cylinder connected to said measuring device and having a logarithmic curved guide formed according to the equation $y = k \log. x$ on its periphery, an indicating device, a displaceable actuating member in engagement with said guide, guiding means extending axially of said cylinder for constraining said actuating member to slide in the direction of the ordinates of the curve of the logarithmic curved guide and coupling means connected to said indicating device and actuating member for establishing driving connection between the former and the latter, said coupling means being capable of transmitting the movement of the actuating member to the indicating device in one direction only.

5. Apparatus for calculating and measuring purposes as set forth in claim 4 in which the coupling means comprises a rotatable drum, a cord connected to the actuating member and wound on said drum and non-reversible driving means connected to said drum and the indicating device.

6. Apparatus for calculating and measuring purposes, comprising in combination a displaceable measuring device for measuring lengths, a rotatable cylinder connected to said measuring device and having a logarithmic curved guide formed according to the equation $y = k \log. x$ on its periphery, an indicating device comprising a rotatable scale drum, a displaceable actuating member in engagement with said guide, guiding means extending axially of said cylinder for constraining said actuating member to slide in the direction of the ordinates of the curve of the logarithmic curved guide, a rotatable cord drum, a cord connected to said actuating member and wound on said cord drum, a driving latch mounted on said scale drum and in driving engagement with said cord drum and a locking latch in engagement with the scale drum for preventing reverse rotation thereof.

7. Apparatus for calculating and measuring purposes, comprising in combination a rotatable drum, a measuring device for measuring lengths wound on said drum, and adapted to be unwound therefrom and rotate the drum during its run-out movement, a cylinder having a logarithmic curved guide on its periphery, coupling means connected to said drum and adapted to engage the said cylinder after the measuring device has been unwound a certain amount from the drum, an indicating device, a displaceable actuating member in engagement with said guide, guiding means for constraining said actuating member to move only in the direction of the ordinates of the curve of the logarithmic curved guide and coupling means connected to said indicating device and actuating member for establishing driving connection between the former and the latter, said coupling means being capable of transmitting the movement of the actuating member to the indicating device in one direction only.

In testimony whereof we have signed our names to this specification.

PAUL JELLINEK.
Dr. FRITZ BEER.